Patented Feb. 28, 1933

1,899,573

UNITED STATES PATENT OFFICE

PAUL KUBELKA, OF PRAGUE, CZECHOSLOVAKIA, ASSIGNOR TO KREBS PIGMENT & COLOR CORPORATION, OF NEWARK, NEW JERSEY, A CORPORATION OF DELAWARE

PROCESS OF PREPARING CLEAR SOLUTIONS OF TITANIUM CHLORIDE

No Drawing. Application filed February 12, 1932, Serial No. 592,657, and in Germany February 23, 1931.

The present invention relates to processes of preparing clear solutions of titanium chloride and consists in dissolving anhydrous titanium tetrachloride in relatively concentrated solutions of titanium chloride containing substantial amounts of hydrochloric acid.

Clear solutions of titanium chloride are required when titanium dioxide pigments are to be prepared therefrom by hydrolysis and subsequent calcination. Titanium tetrachloride is obtained on an industrial scale by treatment of ilmenite or other titaniferous materials with chlorine at elevated temperature. When such titanium tetrachloride is dissolved in an aqueous solvent, one meets the difficulty that at already low concentrations very turbid solutions are obtained with separation of titanium oxychloride or titanium oxygen compounds.

I found that clear concentrated titanium chloride solutions can be obtained directly from titanium tetrachloride if the latter is mixed with an aqueous titanium chloride solution containing HCl, free and combined in an amount in excess of 150 grams per liter. In operating in this manner, no detrimental turbidities have been obtained, such as could not be avoided in prior processes and one obtains clear solutions of any desired concentrations.

Dissolution of the titanium chloride is accompanied in this manner with a slight increase in temperature and copius development of hydrochloric acid gas. Due to this evolution of hydrochloric acid gas, the concentrated titanium chloride solutions obtained in this manner will contain less chlorine than would correspond to titanium tetrachloride. One obtains, for instance, a solution containing the equivalent of 550 grams $TiO_2$ and 600 grams HCl in which the ratio of tetravalent Ti to chlorine is about 1:2.6.

As the solvent for the tetrachloride I can, for instance, use a solution of titanium chloride as obtained by dissolving a titanium oxygen compound in an excess of concentrated hydrochloric acid and which has been adjusted to an HCl concentration corresponding to about 60 grams $TiO_2$ or about 160 grams HCl, combine, per liter. Preferably one uses as the solvent the clear concentrated solution of titanium chloride as obtained in the process itself. Such solution is then diluted with water or even better, with dilute hydrochloric acid and is adjusted to the desired concentration.

This operation can also be carried out in a continuous manner. To this effect, I run continuously and separately the titanium tetrachloride and an aqueous solvent into a titanium chloride solution of the desired strength, namely, containing more than 150 grams HCl free and combined per liter.

The apparatus which can be used for operating in this manner consists of a tank with a good agitator and an overflow together with the necessary feed pipes. The newly formed titanium chloride solution then continuously overflows as the aqueous solvent and tetrachloride is continuously added. I can use here as the aqueous solvent, water, dilute hydrochloric acid or the spent acid obtained in the hydrolysis of the finished titanium chloride solution.

I claim:

1. In a process for the preparation of a clear aqueous titanium chloride solution, the step which comprises dissolving titanium tetrachloride in an aqueous titanium chloride solution containing at least 150 grams of HCl free and combined per liter.

2. In a process for the preparation of a clear aqueous titanium chloride solution, the step which comprises simultaneously and separately introducing titanium tetrachloride and an aqueous solvent into a body of an aqueous titanium chloride solution containing more than 150 grams HCl free and combined per liter and continuously recovering therefrom the titanium chloride solution formed.

In testimony whereof, I affix my signature.

PAUL KUBELKA.